3,483,002
**GELATINOUS COLORING COMPOSITION
AND PROCESS**
William Stein, Brooklyn, N.Y., assignor to H. Kohnstamm
 & Company, Inc., New York, N.Y., a corporation of
 New York
No Drawing. Filed Nov. 15, 1966, Ser. No. 594,387
Int. Cl. A23l 1/26
U.S. Cl. 99—148                                    9 Claims

ABSTRACT OF THE DISCLOSURE

A gelatinous coloring composition containing hydrogenated vegetable oil, sugar, an edible gum, a binder of starch or gelatin, at least one FD & C food color and may optionally contain a solvent and/or a disintegrating agent from the reaction of sodium carbonate with tartaric acid.

---

This invention relates to an improved gelatinous composition of matter as a medium for the transfer of color and flavor into foods, confectionery and the like and to a method of preparing the same.

In the prior art, in particular, Denny patent U.S. 1,388,174 there are described gelatinous compositions of matter in which the coloring and/or flavoring agent is substantially uniformly dispersed. In the manufacture of such gelatinous compositions, it was found that on standing or on passing through one or more changes in temperature the compositions undergo physical changes, often becoming hard and crystalline thereby rendering those compositions undesirable for use as a transfer medium. This hardening is due to the fact that the coloring agent, which is in an aqueous solution in the gelatinous composition, recrystallizes from solution either as a result of water vaporization from the composition or as a result of changes in temperature. To overcome this difficulty, it was proposed in Koch patent U.S. 2,535,538 that the coloring agent first be completely dissolved in a hydrophilic solvent such as glycerin, and then colloidally dispersed throughout the gelatinous solution while both solutions are in the liquid phase, and subsequently an edible dispersing agent is added to the liquid phase dispersion which holds the color solution in dispersion throughout the gelatinous solution. This dispersing agent prevents substantial recrystallization of the coloring agent out of the dispersing solution upon solidification of the composition on cooling.

While these compositions containing a dispersing agent result in somewhat improved storage stability, the presence of water in the glycerin solvent reduces the stability and storage properties of the compositions. Moreover, the production of these gelatinous compositions is cumbersome, messy and not economical because there is a substantial time lag between mixing of the ingredients and molding operations in order to obtain a moldable mass.

Accordingly, one aspect of the present invention is to provide gelatinous compositions having improved storage and stability properties.

Another aspect of the present invention is to provide gelatinous compositions in which there is incorporated a fusing agent which substantially reduces the time lag between the mixing and molding operation and increases storage stability.

A still further aspect of the present invention is to provide a process for manufacturing gelatinous compositions which results in greater ease of handling of the ingredients and permits continuous processing.

An additional aspect of the present invention provides for a gelatinous composition which can be formulated into tablets for convenient use and ease of handling.

These and other aspects of the invention will become apparent from the following description.

It has been discovered that improved gelatinous compositions can be prepared which do not require the use of water in their preparation. The elimination of water from the gelatinous compositions of the present invention substantially improves their storage and stability properties and facilitates the manufacture of the compositions. Furthermore, some of the gelatinous compositions of the present invention may be formulated into tablets using conventional prior art tableting techniques. The tablets made according to the present invention are easy to use, save time in handling, eliminate leakage or other messiness, or unsanitary conditions incident to the use of liquids. Further, the use of tablets allows for greater accuracy in obtaining a predetermined degree of coloration in foods and the like.

The gelatinous compositions of the present invention comprise the following ingredients:

(a) A certified FD & C color such as FD & C Red No. 2, FD & C Red No. 3, FD & C Yellow No. 5, FD & C Yellow No. 6, FD & C Blue No. 1, FD & C Violet No. 1, etc. Since water has been eliminated from the compositions of the present invention, both water soluble and insoluble certified food color can be employed; (b) A sugar (e.g. dextrose, mannitol, etc.); (c) A material which serves as an excipient and binder such as starch or gelatin, the latter being used when it is desired to eliminate the opacifying effect of the starch; and (d) A material which serves as a dispersant and binder such as an edible gum (e.g. gum arabic, gum tragacanth).

In addition to the aforestated ingredients the gelatinous compositions of the present invention contain at least one of the following ingredients, the selection of which is determined by numerous factors. For example, when it is desired to employ a "dry-mix" which is formulated into tablets there is included in the composition at least one disintegrating agent (e.g. product obtained from reaction of sodium bicarbonate with tartaric acid). In the manufacture of the "dry-mix" composition a solvent such as glycerin, propylene glycol, etc. is not used. The ingredients of the "dry-mix" gelatinous composition may be mixed together in any desired order to obtain a uniform dispersion and such mixing is carried out in any suitable mixing apparatus capable of thoroughly dispersing ingredients, for example, a homogenizing mixer or a high speed blender. The use of a dry-mix composition has numerous advantages in that it permits easy formulation into tablets and eliminates leakage and other messiness incident to the use of liquids.

There can also be prepared according to the present invention a gelatinous composition which contains a fusing agent such as a hydrogenated vegetable oil. The use of a fusing agent substantially increases the storage and stability properties of the gelatinous composition and eliminates a substantial time lag between mixing of the ingredients and the molding operation. The hydrogenated vegetable oil is included in a gelatinous composition which contains at least one certified food coloring agent, a sugar, an excipient and binder, e.g. starch or gelatin, an edible gum, and if desired, one or more dispersing agents. In the gelatinous composition of the present invention which contains a fusing agent the inclusion of an FDA approved solvent such as glycerin, propylene glycol and 1,3 butylene glycol is optional. If no solvent is used the composition containing the fusing agent can be formulated into tablets by passing the composition through a suitable tablet-making machine to turn out tablets of uniform size and weight.

If desired, a solvent may be included in this gelatinous composition together with the hydrogenated vegetable oil. When such a solvent is employed, it has been found that a substantial improvement in the production and handling of the gelatinous composition can be achieved by preparing a pre-mixed, pre-weighed base which results in substantial time-saving in the manufacturing operation and permits continuous processing. The advantage of having a pre-mixed, pre-weighed base available simplifies the manufacture of the gelatinous composition to the point where it is only necessary to add the coloring agent and fusing agent to the pre-mixed, pre-weighed base, rather than go through the entire manufacturing operation each time it is desired to obtain the coloring composition.

The pre-mixed, pre-weighed base comprises an admixture of a sugar, an FDA approved solvent and an edible gum. These materials may be mixed together in any order. One manner of mixing these materials is to first dissolve the gum in the solvent and then add the sugar. This premixed base is a pasty mass of uniform dispersion which can be prepared in a dough mixer, or the like. A coloring agent and fusing agent are incorporated into the pre-mixed base either separately or together. The manner of adding these materials and others such as gelatin, or starch to the pre-mixed base is also not critical. In the practice of this invention, the fusing agent may be added to the premixed base before or after it has been melted. Thus, if desired the fusing agent and the coloring agent may be added to the pre-mixed base and this combined mixture is subjected to heating until a fused mass is obtained in which the ingredients are uniformly dispersed. Alternatively, the fusing agent may be melted prior to addition to the pre-mixed base.

The fused mass is then cast into trays and cooled to room temperature and cut. This fused jelly-like mass can be packed or wrapped and handled without difficulty. If desired, this composition can be manufactured into tablets of predetermined weight and size. When incorporated into confectionery or the like the gelatinous composition is liquefied by heating the confectionery above the melting point of the fusing agent which results in even distribution of the composition throughout the confectionery, e.g. candy, or the like.

Another manner in which the gelatinous compositions containing a hydrogenated vegetable oil and solvent may be manufactured is as follows: The hydrogenated vegetable oil and solvent are heated together until a fused mass is obtained. To this fused mass there is added the edible gum, sugar, certified food color, and if desired, a flavoring agent. It has been found that when using FD & C Blue No. 1 or FD & C Violet No. 1, it is more desirable to pre-mix the coloring agent with the sugar prior to incorporation into the fused mass comprising the solvent and hydrogenated vegetable oil. However, with other certified food colors such pre-mixing is optional. This reaction mass is stirred while maintaining a temperature at least as high as the melting point of the hydrogenated vegetable oil until a uniform dispersion is obtained (which is checked by analysis is accordance with recognized techniques in the prior art). The fused mass is then cast into trays and cooled as previously described.

In preparing the gelatinous compositions of the present invention the selection of the hydrogenated vegetable oil and the quantity of the ingredients in the composition may be varied as desired. It is preferred, but not essential, that the certified food coloring agent comprise about 25 percent by weight of the composition. Obviously the quantity of coloring agent will be dependent upon the desired tint, the quantity of standard batch to be mixed, and the characteristics of the food product to which the coloring agent is added. Similarly the quantity of flavoring agent is dependent on the strength of the flavor desired. Also hydrogenated vegetable oils other than those illustrated herein can be employed.

The following examples specifically illustrate the gelatinous compositions of the present invention and their process of manufacture.

EXAMPLE 1

| Ingredients: | Percent by weight |
|---|---|
| FD & C Red No. 2 | 25 |
| Dextrose | 50 |
| Starch | 15 |
| Gum arabic | 6 |
| Sodium bicarbonate | 3 |
| Tartaric acid | 1 |

The FD & C Red No. 2 is reduced to small particle size, as by milling, and is mixed with the other ingredients of the mixture in a high speed blender until the desired dispersion is obtained. This blending results in a dry-mix composition which is passed through a conventional tablet-making machine under pressure to obtain tablets of about one-quarter inch diameter.

EXAMPLE 2

| Ingredients: | Percent by weight |
|---|---|
| FD & C Red No. 2 | 25 |
| Mannitol | 50 |
| Starch | 15 |
| Gum arabic | 6 |
| Hydrogenated vegetable shortening | 4 |

A commercially available hydrogenated vegetable oil was used having a melting point between 119°–123° F. and a maximum free acid content of 0.1% by weight. This shortening comprises the glycerides of fatty acids having the following approximate percent by weight distribution: 20 percent palmitic acid, 27 percent stearic acid, 50 percent oleic acid, 2 percent linoleic acid and less than 2 percent (combined) of lauric, myristic and palmoteleic acids.

The hydrogenated vegetable shortening is first melted and then the mannitol is added followed by the starch and the color. The ingredients are stirred until a homogeneous fused mass is obtained. The fused mass is then cast into trays and cooled to room temperature and cut to the desired size, weight and shape.

EXAMPLE 3

The same gelatinous composition was manufactured as described in Example 1, except that gelatin was substituted for starch. The dry mix was formulated into tablets.

EXAMPLE 4

The same gelatinous composition was manufactured as described in Example 2, except that F D & C Red No. 3 was the color and gelatin was used to replace starch. The fused mass obtained was passed through a conventional tableting machine to obtain tablets of about one-quarter inch diameter.

EXAMPLE 5

| Ingredients: | Percent by weight |
|---|---|
| FD & C Violet No. 1 | 25 |
| Dextrose | 45 |
| Glycerin | 20 |
| Gum arabic | 5 |
| Hydrogenated vegetable shortening | 5 |

A commercially available hydrogenated vegetable shortening was used which is a hydrogenated coconut oil having a melting point between 91–93° F. and a free fatty acid content of .05 percent by weight. This shortening comprises the glycerides of fatty acids having the following approximate percent by weight distribution; 8 percent caprylic acid, 7 percent capric acid, 48 percent lauric acid, 18 percent myristic acid, 9 percent palmitic acid and 10 percent stearic acid.

The hydrogenated vegetable shortening and glycerin are heated together until a fused mass is obtained. The dry gum is then added followed by the addition of an admixture of dextrose and FD & C Violet No. 1, previously reduced to small particle size. The reaction mass is stirred while maintaining a temperature on a steam bath of 120° F. until a uniform dispersion is obtained. The fused mass is then cast into trays and cooled to room temperature and cut into any desired size. This composition can be packaged or wrapped and handled without difficulty.

EXAMPLE 6

| Ingredients: | Percent by weight |
|---|---|
| FD & C Red No. 2 | 26 |
| Dextrose | 31 |
| Gelatin | 9 |
| Gum arabic | 1 |
| Glycerin | 27.5 |
| Atlas "Tween"—dispersing agent (optional) | 0.5 |
| Hydrogenated vegetable shortening | 5 |

The hydrogenated vegetable shortening of Example 5 and glycerin were heated until a fused mass formed as described in the previous example. The dry gum is added, followed by addition of gelatin, Atlas "Tween," sugar and color. The entire reaction mass is heated until a uniform dispersion is obtained and the fused mass is cooled as previously described.

EXAMPLE 7

A pre-mixed base was prepared by dissolving 1.4 percent by weight gum arabic in 31.1 percent by weight glycerin and then adding to this mixture 67.5 percent by weight dextrose. This admixture is dispersed in a dough mixer until a homogeneous dispersion is obtained.

Using the pre-mixed base, a gelatinous composition was prepared.

| Ingredients: | Percent by weight |
|---|---|
| Pre-mixed base of this example | 70 |
| FD & C Red No. 2 | 25 |
| Hydrogenated vegetable shortening | 5 |

The hydrogenated vegetable shortening of Example 5 and color material are added to the pre-mixed base and the mixture is heated to a temperature of about 120° F. to melt the hydrogenated vegetable oil until a fused mass results. The heating is continued with stirring until a uniform dispersion is obtained. The fused mass is then cast into trays and cooled as previously described.

The gelatinous compositions of the present invention are extremely easy to use and manufacture and have excellent storage and stability properties.

Other variations and embodiments will be apparent to those skilled in the art and it is accordingly desired that the scope of the invention is to be limited solely by the appended claims.

What is claimed is:

1. A uniformly dispersed gelatinous composition for use as a food and confectionery coloring agent comprising at least one certified FD & C food color, a sugar, an edible gum, and as a fusing agent a hydrogenated vegetable oil which is a solid at room temperature, and as a binder a member selected from the class consisting of gelatin and starch, said fusing agent being present in said composition in an amount sufficient to increase the storage and stability properties of said gelatinous composition.

2. A gelatinous composition according to claim 1 in which there is included as an additional ingredient an FDA approved non-aqueous solvent.

3. A tablet for the transfer of color into food and confectionery, comprising at least one certified FD & C food color, a sugar, an edible gum, and as a fusing agent a hydrogenated vegetable oil which is a solid at room temperature, and as a binder a member selected from the class consisting of gelatin and starch, said fusing agent being present in said composition in an amount sufficient to increase the storage and stability properties of said tablet and said tablet being substantially water and solvent free.

4. A tablet according to claim 3, wherein the certified food color constitutes about twenty-five percent by weight of the composition.

5. A gelatinous composition for use as a food and confectionery coloring agent consisting essentially of at least one certified food color, a sugar, an edible gum, a member selected from the group consisting of gelatin and starch, and at least one disintegrating agent which is the product resulting from the reaction of sodium bicarbonate with tartaric acid, said composition being water free.

6. A gelatinous composition according to claim 5 in the form of a tablet.

7. The method of forming a colored gelatinous composition which comprises heating a hydrogenated vegetable oil and an FDA approved non-aqueous solvent until a fused mass is obtained, adding to said fused mass an edible gum and an admixture of a sugar and a certified food color, heating the reaction mass with stirring at elevated temperatures until a uniform dispersion is obtained and then cooling to solidification temperature of the gelatinous composition.

8. The method of forming a colored gelatinous composition which comprises: (1) forming a pre-mixed base by mixing a sugar, an edible gum and an FDA approved non-aqueous solvent until a uniform dispersion is obtained; (2) adding at least one certified food color and a hydrogenated vegetable oil to said pre-mixed base, heating said pre-mixed base containing said food color and hydrogenated vegetable oil to obtain a fused mass of uniform dispersion and subsequently cooling said fused mass to about room temperature.

9. The method according to claim 8, including the step of adding a member selected from the class consisting of gelatin and starch to said pre-mixed base prior to obtaining said fused mass.

References Cited

UNITED STATES PATENTS

| 2,535,538 | 12/1950 | Koch | 99—148 XR |
| 2,600,381 | 6/1952 | Adler et al. | 99—148 |
| 2,861,891 | 11/1958 | Christopher et al. | 99—130 XR |
| 3,316,101 | 4/1967 | Borenstein et al. | 99—130 XR |
| 3,347,682 | 10/1967 | Rosenstein et al. | 99—130 XR |

RAYMOND N. JONES, Primary Examiner

J. M. HUNTER, Assistant Examiner

U.S. Cl. X.R.

99—130